US 9,455,930 B2

(12) United States Patent
McCormack et al.

(10) Patent No.: US 9,455,930 B2
(45) Date of Patent: Sep. 27, 2016

(54) SYSTEM AND METHOD FOR ROUTING WORK REQUESTS IN AN ENTERPRISE

(71) Applicant: Avaya Inc., Santa Clara, CA (US)

(72) Inventors: Tony McCormack, Galway (IE); Paul D'Arcy, Galway (IE); John French, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 151 days.

(21) Appl. No.: 14/305,079

(22) Filed: Jun. 16, 2014

(65) Prior Publication Data
US 2015/0365342 A1    Dec. 17, 2015

(51) Int. Cl.
G06F 15/16    (2006.01)
H04L 12/911   (2013.01)
H04L 12/24    (2006.01)
H04L 12/26    (2006.01)

(52) U.S. Cl.
CPC .......... H04L 47/70 (2013.01); H04L 41/0896 (2013.01); H04L 41/5051 (2013.01); H04L 43/0817 (2013.01)

(58) Field of Classification Search
CPC .......... H04M 3/5232; H04M 3/5233; H04M 3/5238; H04M 3/523; H04M 7/0027; H04M 2203/402; H04M 2203/158; H04L 51/32; H04L 65/1069; H04L 65/4007; H04L 63/10; H04L 67/327; H04L 67/306; H04L 41/5003; H04L 47/821; H04L 67/1036; G06F 3/0631
USPC .......... 709/224, 226, 229, 231–232
See application file for complete search history.

(56) References Cited

U.S. PATENT DOCUMENTS

| | | | | |
|---|---|---|---|---|
| 6,498,783 B1* | 12/2002 | Lin | ...................... | H04L 12/2697 370/252 |
| 6,661,889 B1* | 12/2003 | Flockhart | ............ | H04M 3/5232 379/265.05 |
| 6,763,104 B1* | 7/2004 | Judkins | ............... | H04M 3/5233 379/265.09 |
| 8,036,372 B2* | 10/2011 | Patakula | ............. | H04M 3/5233 379/265.11 |
| 8,386,639 B1* | 2/2013 | Galvin | ................... | G06Q 10/06 370/270 |
| 8,520,831 B2* | 8/2013 | Kuns | ...................... | H04M 3/22 379/265.02 |
| 2001/0040887 A1* | 11/2001 | Shtivelman | .......... | G06Q 10/107 370/352 |
| 2002/0067822 A1* | 6/2002 | Cohen | ................... | H04M 3/523 379/265.12 |
| 2006/0109975 A1* | 5/2006 | Judkins | ............... | H04M 3/5233 379/265.02 |
| 2008/0144803 A1* | 6/2008 | Jaiswal | ............... | H04M 3/5233 379/265.12 |

* cited by examiner

*Primary Examiner* — Ruolei Zong (57) ABSTRACT

A resource allocation system of an enterprise is disclosed for allocating resources for a work request in an enterprise. The resource allocation system includes a monitor module configured to monitor the work request and availability of the resources in the enterprise, wherein the work request is characterized by one or more attributes. The resource allocation system further includes a resource matching module configured to match the attributes of the work request with the resources to determine one or more first type and second type of resources. The resource allocation system further includes an assignment module configured to assign the first type of resources to the work request while the second type of resources are unavailable, and re-assign the second type of resources to the work request when the second type of resources become available.

20 Claims, 5 Drawing Sheets

SYSTEM AND METHOD FOR ROUTING WORK REQUESTS IN AN ENTERPRISE

BACKGROUND

1. Field

Embodiments of the present invention generally relate to a system and method to route work requests in an enterprise, and particularly to a system and method for routing a work request initially to a sufficiently suitable resource, while concurrently searching for a more suitable resource for later routing the work request.

2. Description of Related Art

Contact centers are employed by many enterprises to service inbound and outbound contacts from customers. A primary objective of the contact center management is to ultimately maximize contact center performance and profitability. An ongoing challenge in contact center administration is monitoring and optimizing contact center efficiency in usage of its available resources. The contact center efficiency is generally measured by metrics such as service level agreement (SLA) and match rate. Contact center resources include the agents, the communication assets (e.g., number of voice trunks, number and bandwidth of video trunks, etc.), the computing resources (e.g., speeds, queue lengths, storage space) and so forth.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out etc.). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature more effectively and/or efficiently compared to an agent of lesser skill level. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

For example, if in a contact center there are five resources capable of handling voice calls and five resources capable of handling video calls, and number of received work request of voice calls in the contact center is two, and number of work requests for video chats is ten, then the agents handling the video chats are overloaded with the received work requests while the agents handling the voice calls are in an idle state. Therefore, the conventional routing techniques may route some of the video call requests to resources that can only handle voice calls to meet service level constraints, which may annoy the customers requesting for video chats. Hence, the conventional routing techniques are inflexible and do not take into account the type of work requests when routing the received work requests to the agents of the contact center.

There is thus a need for a system and method to provide an automated mechanism to guarantee most optimal agent allocation, even when a less optimal resource has to be selected initially.

SUMMARY

Embodiments in accordance with the present invention provide a resource allocation system for allocating resources for a work request in an enterprise. The resource allocation system includes a monitor module configured to monitor the work request and availability of the resources in the enterprise, wherein the work request is characterized by one or more attributes. The resource allocation system further includes a resource matching module configured to match the attributes of the work request with the resources to determine one or more first type and second type of resources. The resource allocation system further includes an assignment module configured to assign the first type of resources to the work request while the second type of resources are unavailable, and re-assign the second type of resources to the work request when the second type of resources become available.

Embodiments in accordance with the present invention further provide a computer-implemented method for resource allocation in an enterprise. The computer-implemented method includes monitoring the work request and availability of the resources in the enterprise, wherein the work request is characterized by one or more attributes, matching the attributes of the work request with the resources to determine one or more first type and second type of resources, allocating the first type of resources to the work request while the second type of resources are unavailable, and re-allocating the second type of resources to the work request when the second type of resources become available.

Embodiments in accordance with the present invention further provide a computer-implemented method for allocation of requested media resources in an enterprise. The computer-implemented method includes monitoring the work request and availability of the media resources in the enterprise, wherein the work request is characterized by one or more attributes, matching the attributes of the work request with the media resources to determine one or more first type and second type of media resources, and allocating the first type of resources to the work request while the second type of resources are unavailable, and re-allocating the second type of resources to the work request when the second type of resources become available.

Embodiments of the present invention may provide a number of advantages depending on its particular configuration. First, embodiments may be relevant to a common scenario in both automated and assisted Contact Center services in order to meet service level constraints. Further, embodiments of the present invention provides a mechanism whereby customer sessions being serviced with sub-optimal resources remain queued so that more suitable resources can be utilized to service the active session if and when those resources become available. For example, in assisted Contact Center services, a less proficient agent may have to be utilized where a highly proficient agent would have been optimal. However, embodiments of the present invention may facilitate the customers to connect with the highly proficient agent after he/she becomes available for service after serving some other customer. Business rules can be employed to determine when the more suitable resources are to be utilized on active sessions.

Next, embodiments of the present invention allow optimal usage of media resources in contact centers. For example, in automated Contact center services, an important customer transaction may be serviced using reduced video definition or via audio only where the necessary media resources are unavailable. Embodiments may monitor resource usage in order to facilitate the customer transaction to gain optimum video definition after the video service becomes available after serving some other customer.

These and other advantages will be apparent from the disclosure of the embodiments described herein.

The preceding is a simplified summary to provide an understanding of some aspects of embodiments of the present invention. This summary is neither an extensive nor exhaustive overview of the present invention and its various embodiments. The summary presents selected concepts of embodiments of the present invention in a simplified form as an introduction to the more detailed description presented below. As will be appreciated, other embodiments of the present invention are possible that utilize, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments are not limited to any particular type of communication system switch or configuration of system elements. Those skilled in the art will recognize the disclosed techniques may be used in any communication application in which it is desirable to provide improved contact processing.

Some known background art may perform a sequential method, such that a support request for a second agent is made after having routed the support request to a first agent. This method tends to be relatively slow. In contrast, embodiments in accordance with the present disclosure include a process whereby, when the request for a preferred agent is initially made, in parallel and as an intermediate step a search for a sub-optimal agent is performed. The parallelism is important since from a customer perspective it is important that the initial customer contact be handled quickly from the time the request arrives at the contact center.

Some known background art may consider that a set of attributes that describes the first agent is a subset of the set of attributes that describes the second agent. This is relatively limiting compared to embodiments herein since embodiments disclose a more generalized approach whereby there is no necessary linkage between the qualifications of the first agent and qualifications of the second agent.

Some known background art may describe only agent selection, without considering improved selection and usage of other contact center resources such as media resources. For example, in the present embodiments, a caller initially may be connected to an audio resource, then later the caller may be upgraded to a video call. In such a situation, although a video resource would be preferred if it were immediately available when the caller called, if no video resource is immediately available then an audio resource (if available) may be used immediately, and the call later upgraded to a video call when appropriate video resources for automated assistance becomes available.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
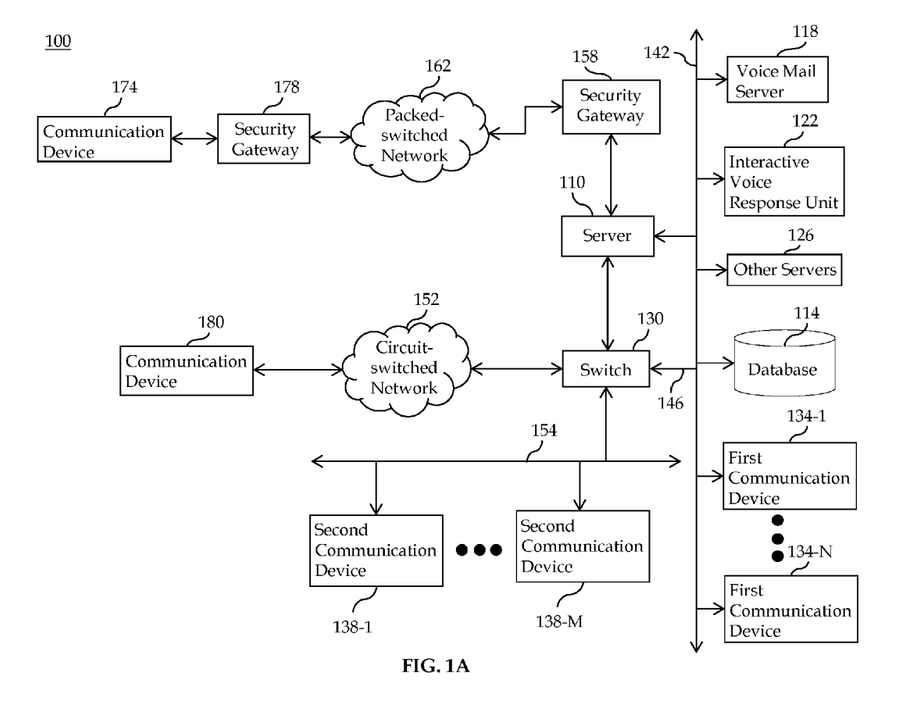
FIG. 1A illustrates a block diagram depicting a contact center according to an embodiment of the present invention.

FIG. 1A shows an illustrative embodiment of the present invention. A contact center 100 comprises a server 110, a set of data stores or database 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Figure 1B:
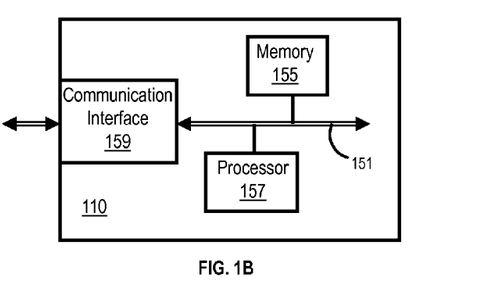
FIG. 1B illustrates at a high level of hardware abstraction a block diagram of a server.

FIG. 1B illustrates at a relatively high level of hardware abstraction a block diagram of a server such as server 110 in accordance with an embodiment of the present disclosure. Server 110 may include an internal communication interface 151 that interconnects a processor 157, a memory 155 and a communication interface circuit 159. Communication interface circuit 159 may include a receiver and transmitter to communicate with other elements of contact center 100, such as switch 130, security gateway 158, LAN 142, and so forth. By use of programming code and data stored in memory 155, processor 157 may be programmed to carry out the various functions of server 110.

Although embodiments are discussed with reference to client-server architecture, it is to be understood that the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments do not require the presence of packet- or circuit-switched networks.

Figure 2:
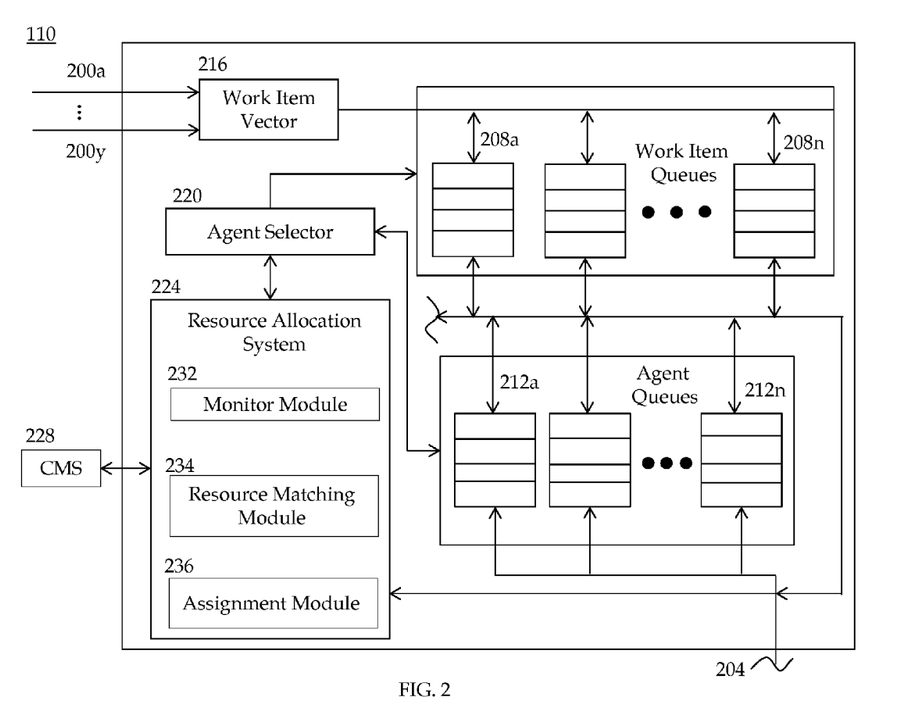
FIG. 2 illustrates a functional block diagram of a server according to an embodiment of the present invention.

Referring to FIG. 2, one possible configuration of the server 110 is depicted at a relatively high level of functional abstraction. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers profile of agents of the contact center and monitors current status of the agents and parameters of the received work requests. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, MultiVantage™ PBX, Communication Manager™, 58300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

As can be seen in FIG. 2, included among the data stored in the server 110 is a set of contact queues or work request queues 208a-n and a separate set of agent queues 212a-n. Each work request queue 208a-n corresponds to a different set of agent queues, as does each agent queue 212a-n. Conventionally, contacts are prioritized and either are queued in individual ones of the contact queues 208a-n in their order of priority, or are queued in different ones of a plurality of contact queues 208a-n that correspond to a different priority. Likewise, each agent's queue 212a-n are prioritized according to his or her level of expertise or skill in that queue, and agents are queued in either individual ones of agent queues 212a-n in their order of expertise level, or in different ones of a plurality of agent queues 212a-n that correspond to a queue and each one of which corresponds to a different expertise level.

Included among the control programs in the server 110 is a work request vector 216. Contacts incoming to the contact center are assigned by the work request vector 216 to different work request queues 208a-n based upon a number of predetermined criteria, including customer identity, customer needs, contact center needs, current contact center queue lengths, customer value, and the agent skill that is required for the proper handling of the contact. Agents who are available for handling work requests are assigned to the agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the work request queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that embodiments of the invention do not require any particular type of information transport medium between switch, server and first and second communication devices, i.e., embodiments may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In one configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1 is for purposes of illustration only and should not be construed as limiting embodiments of the invention to any particular arrangement of elements.

As will be appreciated, the server 110 is notified via the LAN 142 of an received work request by communications component (e.g., switch 130, fax server, email server, Web Server, and/or other servers) receiving the received work requests as shown in FIG. 1. The received work request is held by the receiving telecommunications component until the server 110 forwards instructions to the component to forward or route the work request to a specific contact center resource, such as the IVR unit 122, the voice mail server 118, and/or first or second communication device 134-1-N, 138-1-M associated with a selected agent. The server 110 distributes and connects these work requests to telecommunication devices of available agents based on the predetermined criteria noted above. When the server 110 forwards a voice contact (or first work request) to an agent, the server 110 also forwards customer-related information from the database 114 to the agent's computer workstation for viewing (such as by a pop-up display) to permit the agent to better serve the customer of the contact center. Depending on the agent's profiles, their current working status, and parameters of the received work requests, the server 110 may assign a multichannel work request to the agents of the contact center. The agents process the received work requests or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Referring to FIG. 2, embodiments in accordance with the present disclosure include, among the programs executing on the server 110, an agent selector 220 and a resource allocation system 224. The agent selector 220 and the resource allocation system 224 are stored either in the main memory or in a peripheral memory (e.g., disk, CD ROM, etc.) or some other computer-readable medium of the contact center. The agent selector 220 effects an assignment between available work requests (or contacts) and available agents in a way that tends to maximize contact center efficiency for the current contact center state. The agent selector 220 uses predefined criteria in selecting an appropriate agent to service the work request. The resource allocation system 224, in particular, obtains, for each of a plurality of contact center business goals or objectives, current status information of agents, or information respecting whether or not a corresponding metrics (for example, the service level agreement) is being met or unmet and/or a level to which the corresponding goal is being met or unmet. For example, exemplary metrics can be expressed as actual, average or median wait times in each work request queues 208a-n, actual, average, or median agent staffing levels in each agent queue 212a-n, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

According to an embodiment of the present invention, the resource allocation system 224 includes a monitor module 232, a resource matching module 234, and an assignment module 236. In some embodiments, one or more of monitor module 232, resource matching module 234, and assignment module 236 may be implemented by one or more software processes running on server 110. Server 110 may implement software processes by use of processor 157 being suitably programmed by use of software instructions stored in memory 155 coupled to processor 157.

The monitor module 232 is configured to collect profile and data of resources or agents of the contact center in an embodiment of the present invention, wherein the agent data for providing customer services is obtained by the contact center in several ways and from several sources. A primary source for collecting the agent data may be the contact center itself. However, information included in the agent data may provide a limited view of the overall characteristics of the agent, specifically the characteristics of the agent with respect to the contact center. The agent profile may include agent's self-description, skill sets, likes, locations etc. The agent's skill sets include agent's interests, education and work histories, technical training, experience supporting a particular industry, company, or caller. The agent skill set may include hobbies, hometowns, favorite sport teams and TV shows, cultural background, and so on, to the extent that such information may be relevant to support of callers to the contact center. In an embodiment of the present invention, the agent profile may be stored and maintained in the database 114 of the contact center.

As user herein, the term "agent skill set" may refer to the set of agent data that is used by the contact center to characterize an agent. Such agent data may include biographical agent data, demographic agent data, and external or internal behavioral agent data, to name a few. The behavioral data may include the agent's history with respect to the contact center and/or any other entity or social media channel. However, the agent data is not limited in this regard and may include any other type of agent data used by the contact center to characterize or classify agents. Further, the agent data may include any other agent data collected from one or more sources external to the contact center. Additionally, the agent profile may be raw data or processed agent data. That is, the agent data may be analyzed to characterize the agent and thereafter used to provide customized or personalized services to the customer. For example, an agent profile may be a set of values associated with an agent and a set of characteristics, where the values are selected based on the agent data obtained. However, the disclosure is not limited in this regard and any other methods for evaluating agent data to provide services that may be used without limitation.

Accordingly, in another embodiment of the present invention, a secondary source of agent data may be utilized, e.g., social media channels. For example, the contact center may be configured to access and monitor social media channels (not shown in figure) to help determined agent skills. The profile of the agent of the contact center may be updated automatically at configurable intervals.

The monitor module 232 is further configured to collect attributes or details from the received work requests such as type of received work request i.e., whether the call made by a customer is a video call, a voice conversation, textual conversation, emails, or an instant messaging. Further, the monitor module 232 is configured to extract context of the received work request based on the inputs selected by the customer in an IVR menu, in an embodiment of the present invention. For example, inputs (e.g., selected button "5" for a "health insurance policy", and "2" for "inquiry") selected by the customer in the IVR menu may generate that the customer desires to inquire about a health insurance policy.

The monitor module 232 is further configured to monitor priority of the work requests in an embodiment of the present invention. For example, a video call may be given a highest priority or "rank 1", voice conversations may have "rank 2", instant messaging may be given "rank 3", emails may be given "rank 4", and so on. In another embodiment of the present invention, the monitor module 232 is configured to collect customer information from the database 114 of the contact center. The customer information may include customer's name, customer's credit history, customer's priority i.e., high priority customer, and low priority customer.

The monitor module 232 is further configured to monitor current status of the agents available in the contact center at the time of received work requests in an embodiment of the present invention. The current status of the agents may include number of existing work requests being handled by the agents, type of work requests being handled, priority of the customers etc. The monitored current status of the agents may then be stored in the database 114 in the form of numerical or graphical representation such as a table, pie charts, bar graphs etc. For example, agent 1 is handling a voice call of a high priority customer, agent 2 is handling an instant messaging chat of a low priority customer, agent 3 is handling a voice call of a low priority customer and simultaneously having a web chat session with another low priority customer, and so on. The database 114 of the contact center may be updated dynamically in an embodiment of the present invention.

The resource matching module 234 is configured to analyze the data collected and monitored by the monitor module 232 in an embodiment of the present invention. Based on the analysis of the data, the attributes/parameters of the received work requests are matched with the profiles and current status of the agents available in the contact center. For example, if a received work request is related to a general health query and the type of the work request is a voice conversation, then an agent who is proficient in dealing with health queries and may handle the voice conversation is matched. If a more proficient agent who has a profile matching with the parameters of the work request is busy on another voice call, then the work request may be matched with the profiles of other agents having a profile similar to the more proficient agent. The matching of the parameters of the work request and profiles of the agents are then stored in the form of a numerical or graphical representation in the database 114 of the contact center.

A match may be deemed when agent proficiency in a skill needed by the customer exceeds a predetermined and/or configurable threshold level. For example, suppose a customer query requires knowledge of a system "X". Further suppose that agent "A" has a 95% proficiency in system "X", agent "B" has a 90% proficiency in system "X", and agent "C" has an 85% proficiency in system "X". If the predetermined and/or configurable threshold level is set to 90%, then agents A and B may both be deemed to be more skilled agents, and agent C deemed to be a less skilled agent. If the configurable threshold is changed (e.g., by action of a human administrator, or by algorithmic action based upon factors such as the available pool of agents with at least some training in system "X", the commercial importance of system "X", and so forth), to a new threshold such as 92%, then agent A will still be deemed to be a more skilled agent, but agents B and C may be deemed to be less skilled agents.

Additional tiers or strata of skill levels beyond "more" and "less" may be implemented, such as "highly", "acceptable", "minimally", or letter grades A-F, or ranges of numeric scores (e.g., 90-100, 80-90, etc.) and so forth.

Further, in an embodiment, the resource matching module 234 is configured to match the attributes of the work request with the resources to determine one or more first type and second type of resources. Resources may include agents of the contact center. A first type of resources may include a set of agents having some but not all skills, qualifications or proficiencies desired by (or useful for servicing) a particular customer. A second type of resources may include a different set of agents having more skills, qualifications or proficiencies (relative to the first type) that are desired by (or useful for servicing) the particular customer, but not necessarily all of the skills, qualifications or proficiencies desired by or useful for servicing the particular customer. Ordinarily, customers of the contact centers will prefer to communicate with the second type of resources. However, if none of the second type of resources are available, the customers may be assigned initially to the first type of resources by the assignment module 236.

In an exemplary embodiment of the present invention, the assignment module 236 is configured to assign the first type of resources to the work request while the second type of resources is unavailable. The assignment module 236 is further configured to re-assign the second type of resources to the work request when the second type of resources becomes available. Therefore, later when the assignment module 236 detects that second type of resources is available for the work requests, the assignment module 236 may initiate a seamless transition of the second type of resources to the first type of resources, only for the on-going work requests. Additionally, the assignment module 236 may also consider a pre-determined time threshold if and when determining whether to allocate the second type of resources in preference over the first type of resources. The pre-determined threshold may signify satisfaction of the customer with the first type of resources and/or a degree of progress in serving the customer. After the pre-determined time interval, a need or preference may no longer exist to allocate a better-matched resource to the customer.

For example, if the monitor module 232 determines that at least one more suitable agent (i.e., the second type of resource) is available for service, then the monitor module 232 may inform the assignment module 236 of the available second type of resource. The assignment module 236 may then first determine whether or not the received work request is still being processed. If the assignment module 236 determines that the work request is still being processed, then the assignment module 236 may facilitate a seamless takeover of session between the less suitable agent and the customer who initiated the work request, in order to allow the more suitable agent to further process the session with the customer.

In an embodiment of the present invention, the assignment module 236 may also consider certain thresholds in time, milestones, status of the session and the like between the less suitable agent and the customer before initiating a seamless takeover of the session. For example, suppose that a threshold in time is 5 minutes, i.e., if a less suitable agent has already spent 5 minutes servicing the present customer then we deem that the less suitable agent should continue servicing the present customer to completion. Further suppose that the assignment module 236 determines that the customer is in communication with the less suitable agent for more than 5 minutes. Upon such a situation, the assignment module 236 may decline to initiate a seamless takeover of the session. Similarly, in another example, if the assignment module 236 determines that the session between the less suitable agent and the customer has crossed a threshold, say if the customer has already entered into a purchasing deal, then again the assignment module 236 may decline to initiate the seamless takeover of the session, which may otherwise deprive the less suitable agent of a benefit such as a commission or points towards a quota, or unfairly reward an intervening agent in the same way.

Further, in an embodiment of the present invention, the assignment module 236 may be configured to request the less suitable agent (who is already in session with the customer) to inform the customer regarding the availability of a more suitable agent (as per requirements of the customer) before assignment module 236 allows the more suitable agent to take over the session with the customer. In yet another embodiment, the assignment module 236 may facilitate the more suitable agent by introducing him or her to the customer before taking over the session.

In an exemplary scenario of an automated call center service, if a received work request is to be handled by an automated IVR system, then at first, attributes of the received work request may be determined. Thereafter, suitable (or requested) media resources may be allocated to handle the received work request, if available. However, if merely suitable media resources are not immediately available, then better matched media resources may be allocated based on availability. In parallel, embodiments may continuously check whether the suitable (or requested) media resources become available. After the suitable (or requested) media resources become available, the available media resources may be allocated in service of the received work request.

For example, it may be determined whether the received work request preferably needs to access a video playback, web chat, voice playback etc. If a video playback is requested and the bandwidth for serving the video playback is already occupied by other customers, then the received work request first may be served with voice playback or text message communication (based on bandwidth availability). Thereafter, after sufficient bandwidth becomes available, the text or audio session with the received work request may automatically and seamlessly be upgraded with a video session.

Figure 3:
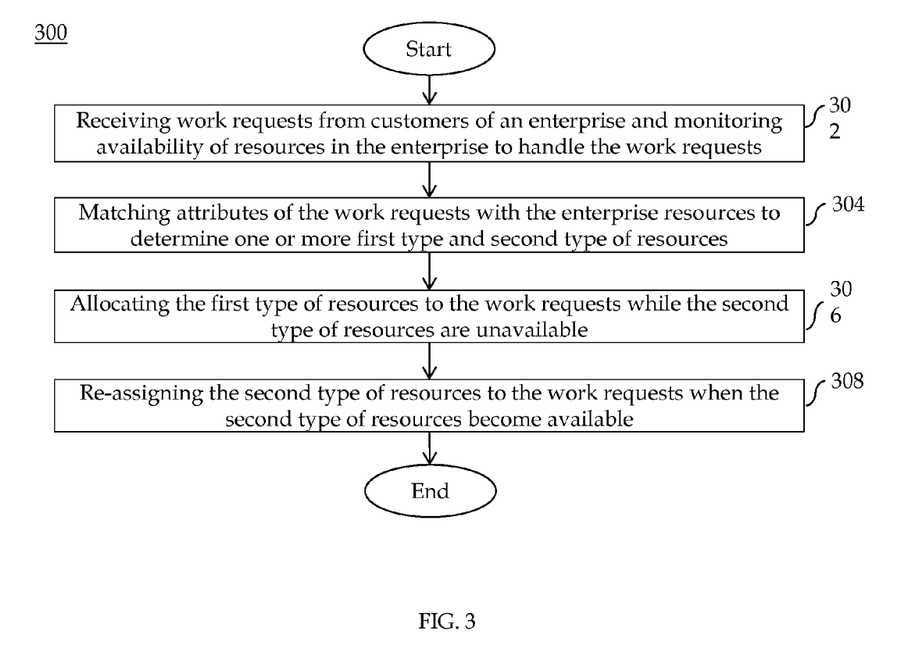
FIG. 3 depicts a flowchart of a method for allocating resources for a work request in an enterprise, according to an exemplary embodiment of the present invention.

FIG. 3 depicts a flowchart of a method 300 for allocating resources for a work request in an enterprise, according to an exemplary embodiment of the present invention. At step 302, a resource allocation system 224 (as described in FIG. 2 of the present application) receives work requests from customers of an enterprise and monitors availability of resources in the enterprise to handle the work requests. Thereafter, at step 304, the resource allocation system 224 matches attributes of the work requests with the enterprise resources to determine one or more first type and second type of resources. Further, at step 306, the resource allocation system 224 allocates first type of resources to the work requests while the second type of resources are unavailable. Furthermore, at step 308, the resource allocation system 224 re-assigns the second type of resources to the on-going work requests when the second type of resources become available.

Embodiments in accordance with the present disclosure may be practiced with automated Contact Center services, in which customers are routed to interact with automated systems before the customers are routed to interact with human agents. In such interactions, important attributes extracted from received work requests may comprise information, such as whether the customer needs to use a high definition (HD) video call, or a standard video call, or a voice call, or a conference call, or text communication etc. Therefore, according to an aspect of the present invention, if it is determined that at least one customer is being served with under allocation of media resources, then the automated system may first determine a list of the media resources that are required to serve the customers and are unavailable to the customer. Thereafter, the automated system may periodically check or monitor the availability of such media resources. After the automated system detects availability of such media resources, the automated system may automatically allocate such media resources to the on-going session between the customer and the automated system in a seamless manner.

For example, suppose a customer requests a HD video call with the automated system of the Contact Center, and the system determines that all the HD video call channels are busy and that the only available channel of communication is a standard video call channel. Therefore, the automated system initially may connect the customer only with the standard video channel. However, the automated channel will periodically check or monitor all HD video channels until one of the HD video channels becomes available for service. Thereafter, the system may automatically and seamlessly upgrade the ongoing video channel of the customer from the standard video call to an HD video call.

Figure 4A:
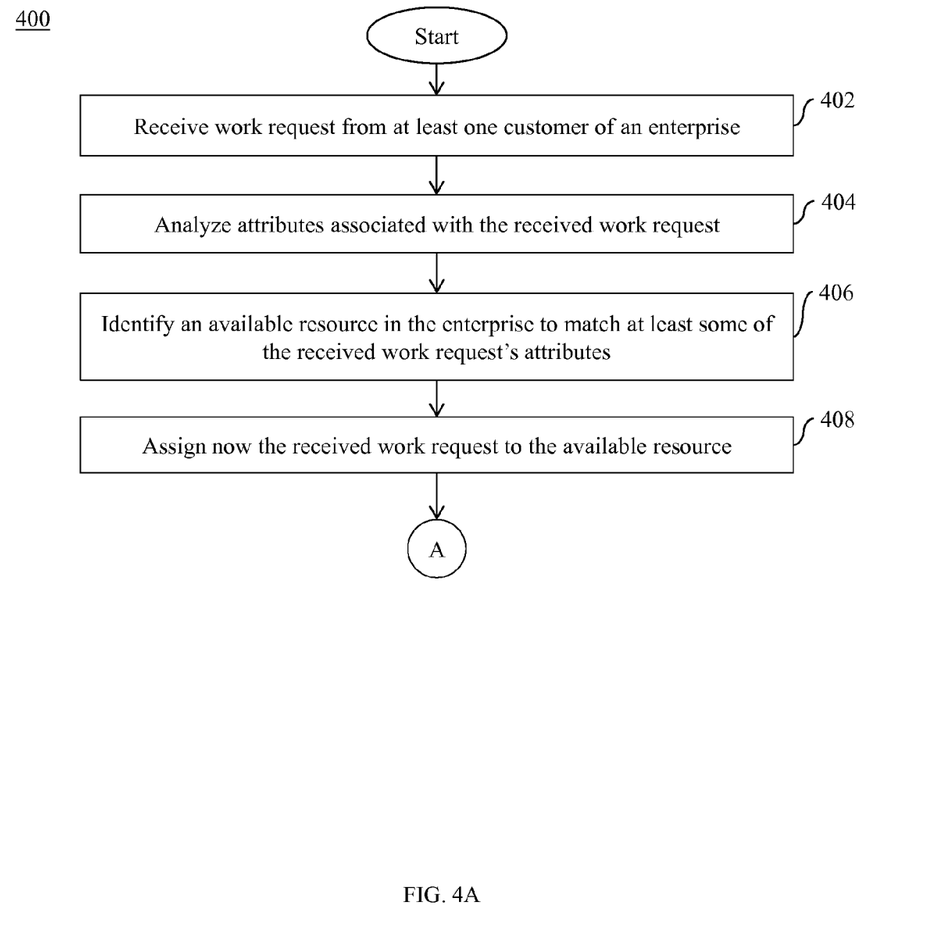
FIGS. 4A and 4B depict a flowchart of a method for ensuring allocation of better-matched resources of an enterprise in service of received work requests from customers, according to an exemplary embodiment of the present invention.
Figure 4B:
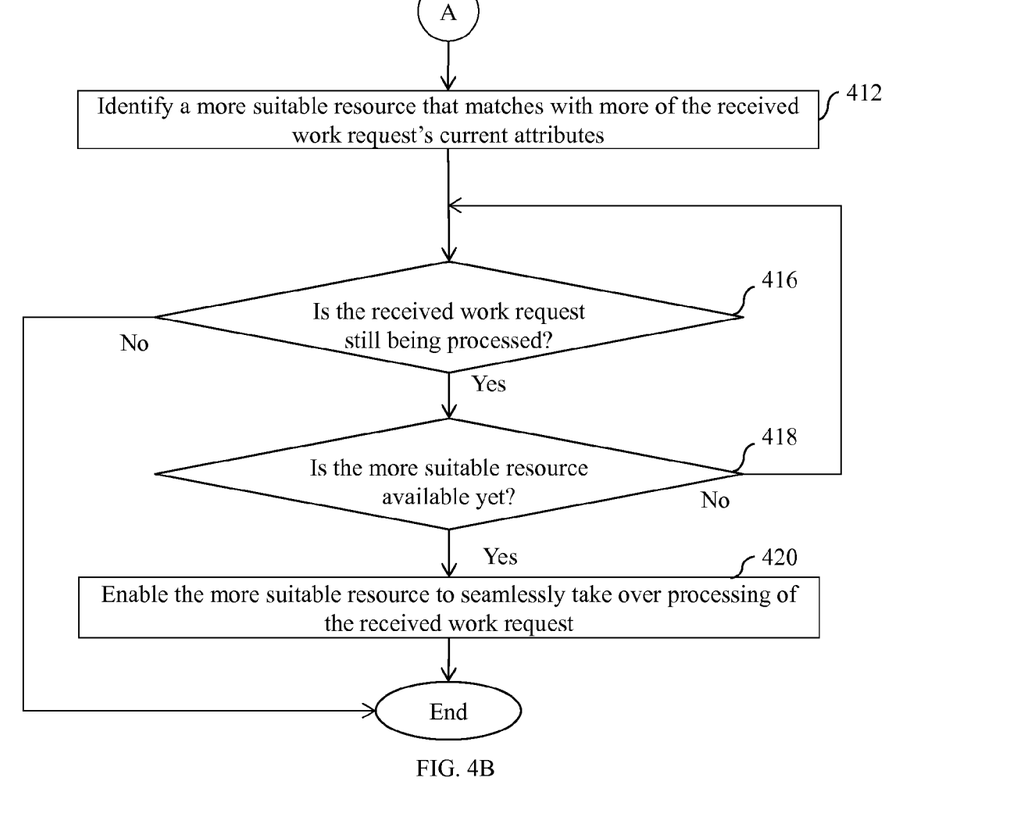

FIGS. 4A and 4B depict a flowchart of a method 400 for ensuring allocation of improved resources of an enterprise in service of received work requests from customers, according to an exemplary embodiment of the present invention.

At step 402, a resource allocation system 224 (as described in FIG. 2 of the present application) may receive a work request from one of its customers. Thereafter, at step 404, the resource allocation system 224 may analyze attributes associated with the received work request. The attributes of the work request may include, but not limited to, requirement of a specific language skill, requirement of a specific technical skill, requirement of specific media resources etc. Further, a nature of the received work requests may be determined by either type or context of the attributes associated with the work requests. For example, the type of received work requests may include whether the call made by a customer is a video call, a voice conversation, textual conversation, emails, or an instant messaging etc. Further, the context of the received work request may be determined based on the inputs selected by the customer in an IVR menu, for example, inputs (e.g., selected button "5" for a "health insurance policy", and "2" for "inquiry") selected by the customer in the IVR menu may reveal that the customer is inquiring about a health insurance policy.

Such attributes may either be directly retrieved from the context of the work requests, or may be retrieved from the database 114, where customer's requirements and previous communications may be pre-stored in their respective customer profiles. For example, the resource allocation system 224 may monitor parameters/attributes of the received work requests i.e., whether the call made by a customer is a video call, a voice conversation, a textual conversation, an email, or an instant messaging. Also, the resource allocation system 224 may extract context of the received work request, based on the inputs selected by the customer in an IVR menu, in an embodiment of the present invention.

Further, at step 404, the resource allocation system 224 may gather agent's profile and data from the database 114 of the enterprise in an embodiment of the present invention. The agent profile may include self-description, skill sets, likes, locations etc. The agent's skill sets may further include agent's interests, education and work histories, hobbies, hometowns, favorite sport teams and TV shows, cultural background, and so on. Accordingly, in another embodiment of the present invention, a secondary source of agent data is utilized, i.e., social media channels (not shown in figure). In another embodiment of the present invention, the profile of the agent of the contact center is updated automatically at configurable intervals.

At step 406, based on the pre-stored agent's profiles and the analyzed attributes of the received work request, the resource allocation system 224 may determine at least one sufficiently suitable agent who is currently available in the enterprise, whose profile matches with at least some of the analyzed attributes of the received work request. The determination by resource allocation system 224 may be by way of, e.g., a correlation process to match resource characteristics to work request needs or characteristics. Further, at step 406, the resource allocation system 224 may monitor current status of the agents of the contact center in an embodiment of the present invention. The current status of the agents may include the number of existing work requests that are being handled by the agents, type of work requests being handled, priority of the customers etc. For example, agent 1 is handling a video call of a high priority customer, agent 2 is handling two instant messaging of low priority customers, agent 3 is handling a voice call of a low priority customer and simultaneously having a web chat session with a low priority customer, and so on. The current status of the agents is then stored in the database 114 of the contact center and is updated dynamically at regular intervals.

Further, the resource allocation system 224 may monitor priority of the work request in an embodiment of the present invention. The received work requests of the contact center may have different priorities in an embodiment of the present invention. For example, voice conversations may have a highest priority or "rank 1", instant messaging may have "rank 2", emails may have "rank 3", and so on. In another embodiment of the present invention, the resource allocation system 224 may also monitor customer information from the database 114 of the contact center. The customer information may include customer's name, customer's credit history, customer's priority i.e., high priority customer, and low priority customer.

Further, at step 406, the resource allocation system 224 may analyze the collected agent profile and monitored data (i.e., current status of the agents and parameters of the received work requests) in an embodiment of the present invention. Based on the analysis of the data, the received work request is matched with the profiles and current status of the agents available in the contact center. For example, if a received work request is related to a "general health query" and the type of the work request is a voice conversation, then at least one agent who is proficient in dealing with health queries and may handle the voice conversation is matched.

At step 408, the resource allocation system 224 assigns the received work request to the sufficiently suitable and available agent identified in step 406. Thereafter, control of process 400 passes to step 412 of FIG. 4B.

At step 412, the resource allocation system 224 continues to search for any agents who may be a more suitable match to the current attributes of the work request than the sufficiently suitable agent identified in step 406. Step 412 may take into account that the current attributes may change as the agent from step 406 handles the call. For example, the agent may determine that a problem that the caller called about (e.g., regarding a declined charge) may require assistance from a more specialized agent (e.g., a fraud specialist), or the caller may have called about two different problems. In general, the caller's needs may change at any point in time, and thus the original set of attributes used in step 406 to select the sufficiently suitable agent may no longer be a suitable match to the caller's current needs. Even if the caller's needs do not change, the changing availability of agents may mean that a more suitable agent may become available while the first agent (i.e., the sufficiently suitable agent) is servicing the call.

For example, step 406 may use attribute set "A" to search for an agent. Step 406 may find an agent who has attribute set "B" who is available right now. Attribute set "B" may be close enough to attribute set "A" in order to deem that the agent having attribute set "B" is a sufficiently suitable agent, but it would be advantageous to continue searching for a better match to the caller's current needs. The agent with attribute set "B" may be used while waiting for a better-matched agent. During the wait, the caller's current needs may change such that now attribute set "C" represents the caller's current needs. Embodiments may determine at least one other more suitable agent whose profile better matches with the attributes that are currently required to handle the received work request and is also available to serve the received work request.

In some embodiments, the suitability of the more suitable agent should exceed the suitability of the less suitable agent by at least a provisionable degree of suitability. Such a feature may be desirable in order to prevent excessive churn with frequent changes of agents. Each change of agent may incur a period of inefficiency as the new agent comes up to speed on the status of the call, or may cause anxiety on the part of a caller who has invested time with the previous agent to explain the problem and may have developed a rapport. The benefit gained by changing agents should exceed the disadvantages caused by inefficiency or anxiety.

Next, control of process 400 transitions to step 416, at which the resource allocation system 224 further determines if the work request is still being processed or not. If it is determined that processing of the received request is completed or finished, then process 400 may end. However, if it is determined by the resource allocation system 224 that the received request is still under processing and is not completed, then the method may proceed to step 418.

In an exemplary embodiment, the resource allocation system 224 may also consider certain thresholds in time or status of the work request being processed when determining whether to reassign a work item. For example, if a threshold in time is 5 minutes and the resource allocation system 224 determines that the customer is in communication with a less suitable agent for more than 5 minutes, or if it is estimated by the agent or the system that the call is more than 75% completed, then the method will end and will not proceed to step 420. Similarly, in another example, if the assignment module 236 determines that the session between the less suitable agent and the customer has crossed a threshold, say if the customer has already entered into a purchasing deal, or if only a wrap-up phase remains, then process 400 may end. The limits above are illustrative. Other limits or events may be used, and the limits may be provisionable by a system administrator.

Next, control of process 400 transitions to step 418, at which the resource allocation system 224 determines whether or not any of the identified more suitable agents possessing a better match to the currently desired skill set has become available. If it is determined that no such agent is yet available, then the method may return to step 416. However, if it is determined that a more suitable agent with more of the currently desired attributes is available, then the method proceeds to step 420.

At step 420, the resource allocation system 224 may enable the identified more suitable resource to take over the session with the customer from the agent who was previously serving the customer. In an embodiment of the present invention, the taking over of the session may be seamless and automatic. In another embodiment, the resource allocation system 224 may first instruct the agent in the communication with the customer to inform the customer first, before letting the more suitable agent take over the session. In yet another embodiment, the resource allocation system 224 may allow the more suitable agent to introduce himself before taking over the session. In this manner, the resource allocation system 224 helps ensure that the customers receive a more suitable level of service from the enterprise even in scenarios where the more suitable resources are not initially available for to serve the customers.

In an exemplary embodiment of an assisted Contact Center service, a customer call may enter into a business process as defined by Avaya Collaboration Designer. The attributes needed to satisfy the caller are extracted as part of the customer profiling/segmentation portion of the business process. A match request is made to Avaya Work Assignment for an agent that has the desired attributes. After a period of time, the business process relaxes some of the attributes in order to meet service level. The attributes which have been avoided remain associated with the call. Avaya work assignment returns an agent resource that matches the relaxed set of attributes, and the caller is connected to the agent. Sometime later, the work assignment engine has an agent available with all of the originally requested attributes. A notification is sent to the business process. Based on the caller profile, the business process interrupts the in-process call and allows the more specialized agent (i.e., a more suitable agent) to greet the customer and take over the call. All context and associated data associated with the call is now accessible to the new agent.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for allocating resources for a work request in an enterprise, comprising:
   a server comprising a processor coupled to a memory, wherein the processor executes instructions stored in the memory to:
   monitor the work request and availability of the resources in the enterprise, wherein the work request is characterized by one or more attributes;
   match the attributes of the work request with the resources to determine one or more first type of resources and one or more second type of resources, wherein the second type of resources are preferred over the first type of resources by a customer associated with the work request;
   assign the first type of resources to the work request while the second type of resources are unavailable; and
   subsequently assign the second type of resources to the work request when the second type of resources later becomes available.

2. The system of claim 1, wherein the first type of resources comprise a first set of characteristics and the second type of resources comprise a second set of characteristics, and wherein a first correlation between the one or more attributes of the work request and the second set of characteristics exceeds a second correlation between the one or more attributes of the work request and the first set of characteristics.

3. The system of claim 2, wherein the first correlation is above a predetermined threshold and the second correlation is below the predetermined threshold.

4. The system of claim 1, wherein one or more of the one or more attributes of the work request change during a period of time between when the first type of resources and the second type of resources are assigned to the work request.

5. The system of claim 1, wherein the resources in the enterprise comprise human agents and media resources.

6. The system of claim 5, wherein the media resources comprise one or more of a video call, voice call, email communication, web chat, or instant messaging.

7. The system of claim 5, wherein profile information for a human agent is pre-stored in a database.

8. The system of claim 1, wherein the one or more attributes of the work request comprise one or more of a type of the work request or a context of the work request.

9. The system of claim 8, wherein the type of the work request comprises one or more of a video call, a voice conversation, an email, a web chat, or an instant messaging chat.

10. The system of claim 1, wherein the processor executes instructions stored in the memory to:
    assign the second type of resources to the work request in a seamless manner, after having assigned the work request to a first type of resource.

11. The system of claim 10, wherein the processor executes instructions stored in the memory to:
    assign the second type of resources only to on-going work requests.

12. The system of claim 11, wherein the processor executes instructions stored in the memory to:
    determine whether an interaction between a customer associated with one of the on-going work requests and an agent associated with the first type of resources has exceeded a predetermined time threshold; and
    prevent assignment of the second type of resources to the work request when the predetermined time threshold has been exceeded.

13. A computer-implemented method for allocating resources for a work request in an enterprise, the method comprising:
    monitoring, by a processor of the enterprise, the work request and availability of the resources in the enterprise, wherein the work request is characterized by one or more attributes;
    matching, by the processor of the enterprise, the attributes of the work request with the resources to determine one or more first type of resources and one or more second type of resources, wherein the second type of resources are preferred over the first type of resources by a customer associated with the work request;
    allocating, by the processor of the enterprise, the first type of resources to the work request while the second type of resources are unavailable; and
    allocating, by the processor of the enterprise, the second type of resources to the work request when the second type of resources become available.

14. The computer-implemented method of claim 13, wherein the resources of the enterprise comprise human agents and media resources.

15. The computer-implemented method of claim 13, wherein the one or more attributes of the work request comprise one or more of a type of the work request or a context of the work request.

16. The computer-implemented method of claim 15, wherein the type of the work request comprises one or more of a video call, a voice conversation, an email, a web chat, or an instant messaging chat.

17. The computer-implemented method of claim 13, wherein the second type of resources are allocated only to on-going work requests.

18. A computer-implemented method for allocating media resources for a work request in an enterprise, the method comprising:

monitoring, by a processor of the enterprise, the work request and availability of the media resources in the enterprise, wherein the work request is characterized by one or more attributes;

matching, by the processor of the enterprise, the attributes of the work request with the media resources to determine one or more first type of media resources and one or more second type of media resources, wherein the second type of media resources are preferred over the first type of media resources by a customer associated with the work request;

allocating, by the processor of the enterprise, the first type of media resources to the work request while the second type of media resources are unavailable; and allocating, by the processor of the enterprise, the second type of media resources to the work request when the second type of media resources become available.

19. The computer-implemented method of claim 18, wherein the media resources comprise one or more of a high-definition video call, video call, voice call, email communication, web chat, or instant messaging.

20. The computer-implemented method of claim 18, wherein the second type of media resources are allocated only to on-going work requests.

* * * * *